United States Patent [19]

Hou

[11] 4,123,760

[45] Oct. 31, 1978

[54] APPARATUS AND METHOD FOR JET DEFLECTION AND RECORDING

[75] Inventor: Shou L. Hou, Centerville, Ohio

[73] Assignee: The Mead Corporation, Dayton, Ohio

[21] Appl. No.: 772,845

[22] Filed: Feb. 28, 1977

[51] Int. Cl.$^{2}$ .............................. G01D 15/18

[52] U.S. Cl. .............................. 346/75; 346/1

[58] Field of Search .............................. 346/75, 1

[56] References Cited

U.S. PATENT DOCUMENTS

| | | | |
|---|---|---|---|
| 3,656,174 | 4/1972 | Robertson | 346/75 |
| 3,798,656 | 3/1974 | Lowy et al. | 346/75 X |
| 3,871,004 | 3/1975 | Rittberg | 346/75 |
| 3,895,386 | 7/1975 | Keur et al. | 346/75 X |

FOREIGN PATENT DOCUMENTS 2,607,704 2/1975 Fed. Rep. of Germany.

*Primary Examiner*—George H. Miller, Jr.
*Attorney, Agent, or Firm*—Biebel, French & Nauman

[57] ABSTRACT

A jet drop recorder produces a continuously flowing stream of recording liquid and has a pair of deflection electrodes positioned therealongside but offset therefrom. The stream of recording liquid is stimulated to break up into uniformly sized and regularly spaced drops, and the electrodes are positioned such that at least portions thereof are upstream from the break-off point. Drops produced by the stream are steered to different laterally separated printing positions by application of a cyclic differential charging signal to the electrodes. This causes a stepped cyclic deflection of the unbroken stream, which in turn directs the drops toward the desired printing positions. There is no need to provide a drop deflection field. Furthermore the filament need not have any particular level of conductivity, as the disclosed electrode configuration produces a gradient electrical field capable of polarizing and deflecting a perfectly dielectric liquid.

A selective drop catching technique is employed in combination with the above mentioned lateral steering. Such catching is accomplished by means of a cooperative charging signal applied simultaneously to the deflection electrodes. This cooperative charging signal causes the unbroken stream to be deflected in a dumping direction perpendicular to the above mentioned direction of lateral deflection. A catcher is positioned for catching of those drops deflected in the dumping direction. A large number of such jet drop recording devices may be arranged in two parallel rows.

26 Claims, 13 Drawing Figures

APPARATUS AND METHOD FOR JET DEFLECTION AND RECORDING

BACKGROUND OF THE INVENTION

This invention relates to the field of jet deflection and has specific application to a recording or printing process wherein one or more jets of recording liquid are controlled to reproduce graphic information on a print receiving medium. An early example of such a device is disclosed in Ranger et al U.S. Pat. No. 1,817,098, wherein a pair of electrodes are positioned on opposite sides of a jet. Control signals are applied to the electrodes to deflect the jet against a catching surface for achieving a no-print condition. A print receiving medium is transported through the active printing region of the jet (or three such jets of different colors), and pictorial information is reproduced by programmed application of no-print or catching signals to the control electrode. Hansell U.S. Pat. No. 1,941,001 discloses a somewhat more advanced symmetrical electrode arrangement for use in facsimile recording.

The Ranger and Hansell patents relate to the control of jets comprising continuously flowing streams, which break up into drops on a random basis in accordance with physical principles described by Lord Rayleigh in the middle of the 19th century. More recently the quality of jet drop recording has been improved by stimulating the stream at a frequency near its natural frequency to create drops which are uniformly sized and regularly spaced. An application of such a technique to character printing is disclosed in Lewis et al U.S. Pat. No. 3,298,030.

In the Lewis patent a plurality of streams are stimulated for drop generation, and the drops are directed toward laterally separated positions by charging the drops to different levels and directing them all through electrostatic deflection fields. Under the action of the deflection fields all drops are deflected in proportion to their level of charge. A series of charge rings are utilized for drop charging and the deflection fields are produced by a pair of deflection electrodes. Character generating circuitry causes the printing of predetermined characters by selectively applying a catching potential to the charge rings. Drops which are charged in response to this catching potential are deflected into an appropriately positioned catcher.

A somewhat more compact arrangement for jet drop printing is disclosed in Sweet et al U.S. Pat. No. 3,373,437, wherein a row of closely spaced streams are produced by a common manifold and are commonly stimulated for drop generation. A series of charging electrodes charge the drops on a binary basis in response to desired "print" or "no-print" conditions. The "no-print" drops are charged to a predetermined level for deflection into a catcher. The "print" drops are uncharged.

The recording head arrangement taught by Sweet et al has been improved and made more compact by using a laminated plate arrangement, including a notched charge plate as shown in Culp U.S. Pat. No. 3,618,858. For application of the Sweet et al technique to a twin row print head, reference may be made to Mathis U.S. Pat. No. 3,701,998. Utilization of the Mathis invention requires a row-to-row switching delay as taught in Taylor et al U.S. Pat. No. RE28,219.

It will be appreciated that binary or on/off printing as taught by Sweet et al requires extremely close jet spacing for high resolution printing. As taught in King U.S. Pat. No. 3,739,395, such spacing requirements may be somewhat relaxed by lateral drop deflection in a manner similar to that of Lewis et al. As shown in King, selective drop catching is achieved by deflection in a direction perpendicular to the lateral scanning direction.

Another patent, Robertson U.S. Pat. No. 3,656,171, teaches a recording technique which eliminates the requirement for drop deflection fields, thereby enabling closer spacing than electrical considerations previously would permit. The Robertson technique, however, is an on/off process, so there remains a packing density problem caused by the necessity of providing apparatus for creating a very great number of closely spaced jets.

SUMMARY OF THE INVENTION

In accordance with the present invention a novel electrode arrangement enables a marked improvement in recording resolution within prior art jet spacing constraints. The novel electrode arrangement enables a liquid stream to be deflected laterally toward a plurality of operating directions and to be deflected in a dumping direction perpendicular to the lateral deflection direction for print/no-print control. By this means any drops which break off from the stream can be directed to any of a plurality of laterally separated printing locations or into a perpendicularly displaced catcher, all without the aid of an electrical deflection field.

The electrodes are placed on opposite sides of the stream, but they are offset from the stream axis. Thus a single pair of electrodes is able to produce stream deflection (and drop positioning) in two perpendicular coordinate directions. For stream deflection in the lateral direction a cyclic differential deflection signal having a net stepping effect is applied to the electrodes. For deflection in the dumping direction a cooperative or common charging signal is applied to the electrodes.

It has been found in accordance with this invention that fairly substantial changes in drop positioning may be achieved with relatively little deflection of the stream itself. This means that the control electrodes may be placed quite close to the stream, at which placement a rather substantial electrical field gradient may exist. This field gradient in turn is capable of polarizing and deflecting a stream of non-conductive or dielectric printing liquid. Thus this invention makes it possible to achieve jet printing with a wide variety of conductive and non-conductive liquids.

In accordance with this invention a plurality of streams may be generated by orifices placed side by side in one or more rows, with each stream passing closely adjacent a pair of electrodes. The electrodes are preferably flat strips plated inside notches on the edge of the charge plate. A cyclic charging potential is impressed upon each plate of each pair to create a differential field for laterally stepped stream deflection and laterally stepped drop positioning.

Catching is accomplished by simultaneous application of a common dumping voltage to both electrodes of an electrode pair. This causes the associated stream to be pulled inwardly toward the electrodes, so that its drops are steered toward an appropriately positioned catcher. Since each stream is laterally deflected for drop deposition at any of a plurality of print positions, it is possible to decrease the size of the stream, while maintaining a relatively large stream spacing.

It is therefore a primary object of this invention to produce a jet drop recorder of improved recording resolution.

Another object of this invention is to provide an array of closely spaced recording jets, each of which is capable of recording in a plurality of laterally separated recording positions.

Still another object of this invention is to provide an improved method for positioning a stream of liquid.

Other and further objects of the invention will be apparent from the following description, the accompanying drawings and the appended claims.

DESCRIPTION OF THE PREFERRED EMBODIMENTS

Figure 1:
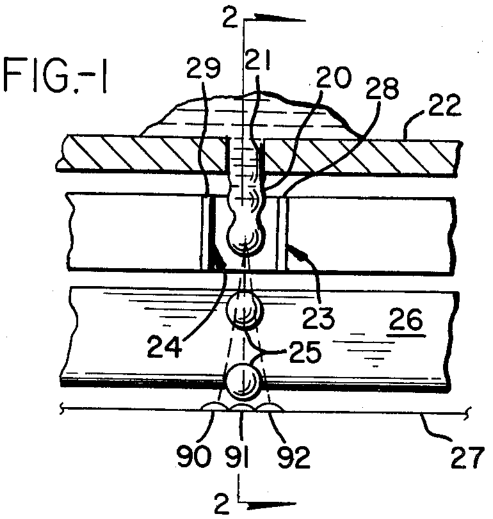
FIG. 1 is a schematic drawing of an electrode arrangement according to this invention, as seen in front elevation.
Figure 2:
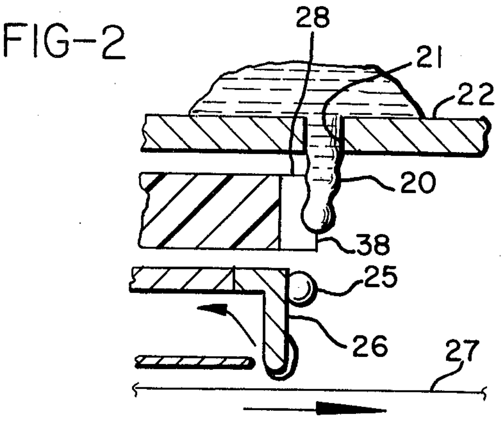
FIG. 2 is a side elevation drawing of an electrode arrangement taken along line 2—2 of FIG. 1.
Figure 3:
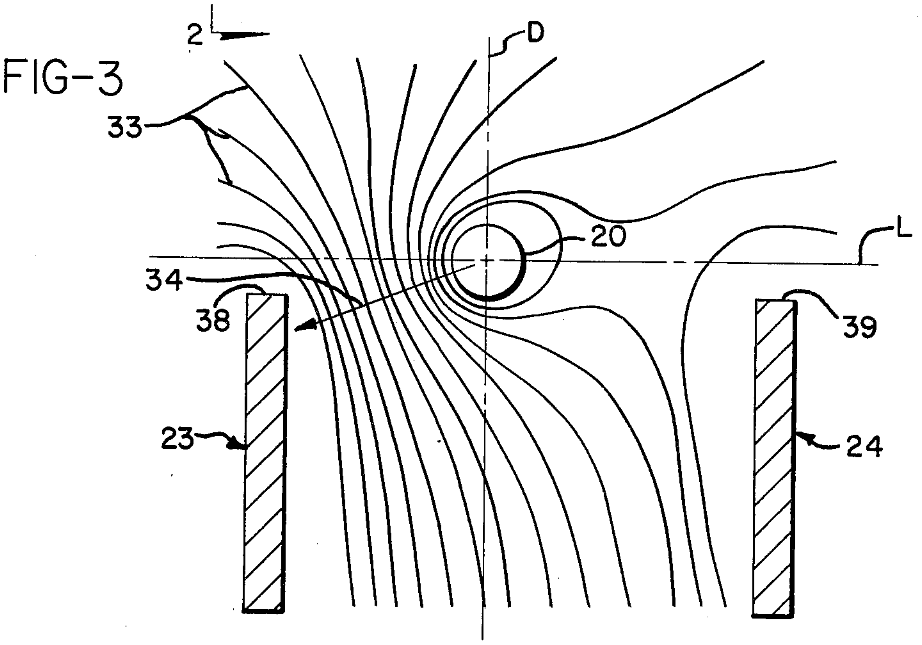
FIG. 3 is a schematic plan view drawing of electrical field lines associated with lateral stream deflection in accordance with this invention.
Figure 4:
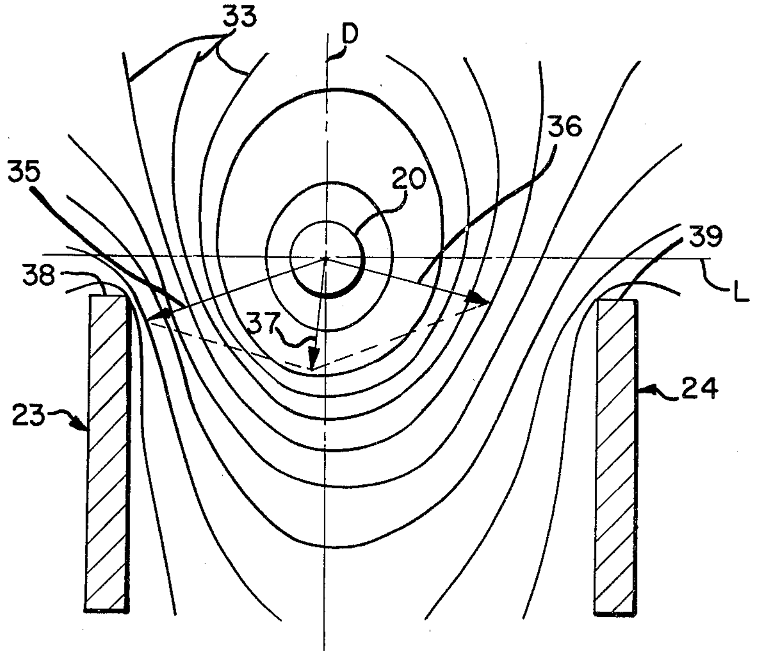
FIG. 4 is a schematic plan view illustration of electrical field lines associated with dumping deflection in accordance with this invention.

Jet drop printing in accordance with this invention may be accomplished with apparatus as illustrated in the simplified schematic drawings of FIGS. 1 and 2. As illustrated therein, a stream of recording liquid 20 flows continuously through an orifice 21 in an orifice plate 22. A pair of deflection electrodes 23 and 24 are disposed on opposite sides of stream 20 but are offset from the axis thereof, as illustrated in FIGS. 3 and 4.

As hereinafter employed the term "offset" will be understood to mean that the deflection electrodes are so positioned relative to the stream axis that the application of a common voltage to the electrodes will produce stream deflection in a direction generally therebetween. For deflection electrodes of the type illustrated in FIGS. 3 and 4, the offset may be great enough to produce a small gap between the illustrated lateral deflection plane L and the electrode leading edges 38 and 39. The height of electrodes 23 and 24 is great enough to straddle the drop breakoff point, and the top surfaces 28 and 29 thereof should extend upwardly above that point.

Figures 9, 10:
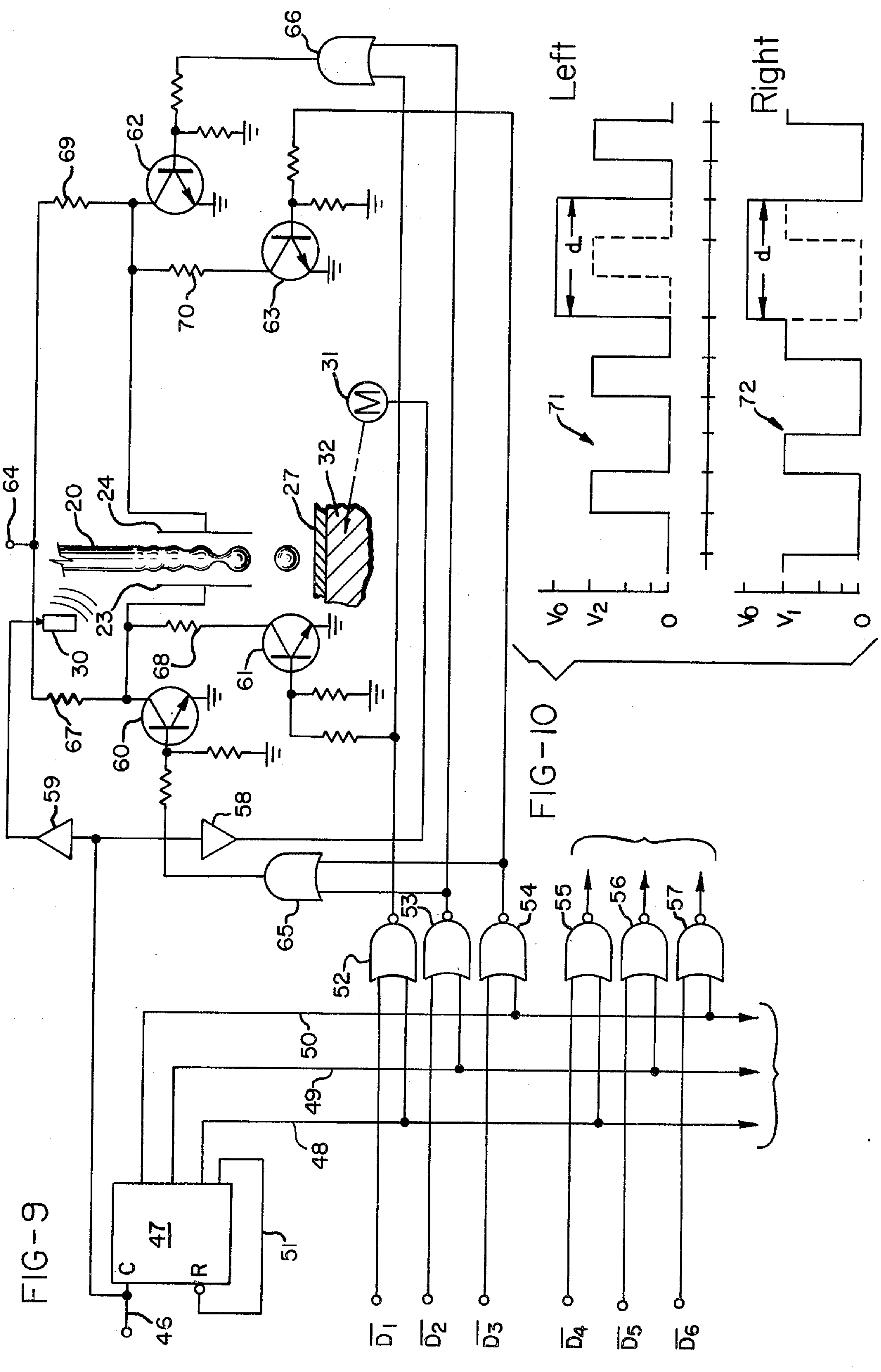
FIG. 9 is a schematic drawing of electrical circuitry for generation of deflection control signals.
FIG. 10 illustrates charging control signals generated by the circuitry of FIG. 9.

The stimulation of stream 20 to break up into drops 25 is accomplished by well known techniques and need not be discussed in detail herein. As described in detail below, the generation of drops 25 is accompanied by application of differential charging potentials to electrodes 23 and 24. This causes drops 25 to deposit successively on a moving web of paper 27 in three different positions labelled 90, 91 and 92. It will be appreciated that drops 25 may be deposited at any number of laterally separated printing positions and that the three positions 90, 91 and 92 are shown for illustrative purposes only. For such positioning it is convenient to drive the drop stimulation transducer 30 (illustrated schematically in FIG. 9) with the same clock signal which controls the generation of the above mentioned differential charging potentials. As shown in FIG. 9, the same clock signal may drive a control motor 31 arranged for driving a take-up roll 32 for the web 27.

Drops 25 are directed toward the laterally separated positions 90, 91 and 92 as a result of deflection of stream 20 by electrodes 23 and 24. The recording liquid in stream 20 travels at a reasonably high velocity, so that when it is deflected in different operating directions the drops are "aimed" in a manner somewhat analogous to pointing a rifle bore and aiming bullets toward a target. Depending upon the conductivity of the recording liquid, the vertical positioning of electrodes 23 and 24 relative to the drop formation point, and the phase relation between drop charging and drop formation drops 25 may or may not carry a significant electrical charge. However, there is no requirement for a deflection field downstream from the drop formation point.

The catching action for non-printing drops is best illustrated in FIG. 2. To accomplish catching a common cooperative deflection potential is applied to electrodes 23 and 24, and this deflects stream 20 in what might be termed the dumping direction. Such dumping deflection of stream 20 causes drops 25 to impact against the face of a catcher 26. A vacuum is applied to catcher 26 to cause ingestion of such drops.

As hereinafter discussed, the recording liquid may be either conductive or dielectric but is preferably conductive. In the case of a conductive recording liquid, lateral deflection of stream 20 to cause printing in position L of FIG. 1 may be accompanied by an electrical field configuration as illustrated schematically in FIG. 3. FIG. 3 illustrates a series of equipotential lines 33 as actually measured in a scaled up two dimensional model. Since the corresponding electrical field is represented at any point by the gradient of the potential function, the electrical field may be visualized as being perpendicular at all points to the lines 33. A dumping plane D and a lateral deflection plane L, both passing through the axis of the stream, are illustrated in the figure.

In order to obtain the plot for the lines 33, a two dimensional area of conductive material representative of stream 20 was electrically grounded as was another area representative of the right hand deflection electrode 24. A deflection voltage $V_1$ was connected to an area simulating the left hand electrode 23, and this produced the illustrated potential field. The naturally resulting electrical field exerts a force against stream 20, and it can be seen that this force acts in a direction as illustrated by the arrow 34. It will be seen that the arrow 34 does not point precisely in the lateral direction but has a small component in the dumping direction. This gives rise to a small printing error, which may be compensated as hereinafter discussed.

For deflection of stream 20 in the dumping direction a common potential $V_0$ is applied to electrodes 23 and 24 produces equipotential lines 33 as illustrated in FIG. 4. The plot of FIG. 4 was obtained the same general manner as the plot of FIG. 3. Here we see that stream 20 is attracted toward electrodes 23 and 24 as illustrated generally by the arrows 35 and 36, but the vector sum of all forces acting on streams 20 is in the dumping direction as illustrated by arrow 37. In the limiting case when $V_0$ is 0 (i.e. at ground potential) the arrow 37 shrinks to a length of 0. This is the situation for printing in the center position C of FIG. 1.

In general the most satisfactory performance is obtained when the centerline of stream 20 is centered between the leading edges 38 and 39 of electrodes 23 and 24. However a small positioning error in the order of about 1 mil in any direction can easily be tolerated. For the plots of FIGS. 3 and 4 the stream 20 is positioned outwardly and to the left of the ideal position.

Figure 5:
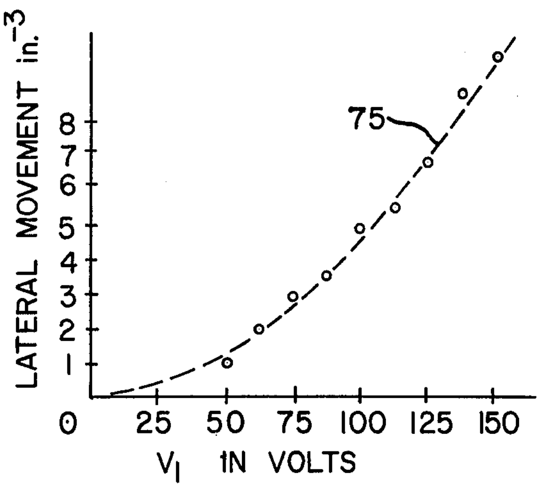
FIG. 5 is a plot of experimental lateral positioning data.
Figure 6:
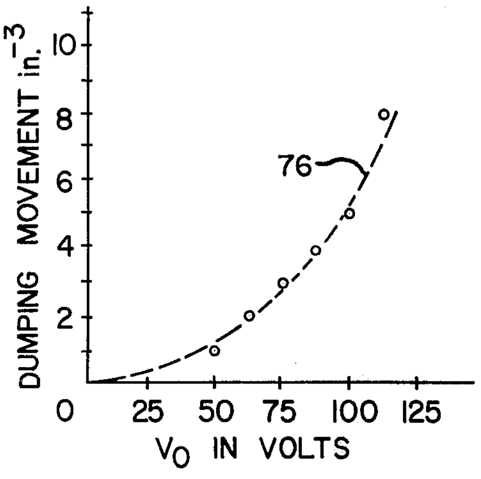
FIG. 6 is a plot of experimental dump positioning data.

Test results for a series of three dimensional experiments are illustrated by curves 75 and 76 of FIGS. 5 and 6 respectively. Curve 75 illustrates lateral drop positioning actually achieved as a function of the voltage $V_1$, when applied differentially (e.g. applied to one electrode only). For this experiment the drops were generated at a frequency of 110 kHz from an orifice having a 1 mil diameter. Electrodes 23 and 24 were arranged symmetrically with respect to the dumping plane D but were offset with respect to the lateral deflection plane L such that their leading edges 38 and 39 were separated therefrom by a distance of about 0.1 mil. The separation distance between deflection electrodes 23 and 24 was 5.9 mils, and the deflection data was measured at a distance of 0.550 inches below the stream forming orifice. The liquid rate for this test was 0.39 milliliters per minute, and the drops formed printed spots of 3 mil diameter. For satisfactory three position recording using such drops, the system should be designed to achieve a lateral drop positioning shift of about 2.2 mils. An electrically conductive, water base printing ink was used for the test.

Curve 75 of FIG. 5 indicates that a recording head operating in accordance with this invention can achieve the desired 2.2 mil lateral positioning shift by application of a potential difference of about 75 volts to the deflection electrodes. For satisfactory catching, a dumping direction shift in the order of about 5 mils is considered to be desirable. Curve 76 of FIG. 6 indicates that such dumping positioning can be accomplished by application of a voltage $V_0$ in the order of about 100 volts to each of electrodes 23 and 24, the stream 20 being connected to a source of ground potential.

As further indicated by the supra linear nature of curve 75 of FIG. 5, there is an increasing lateral drop positioning shift sensitivity with increasing differential voltage. Thus while 62 volts produces a shift of only 2 mils, 90 volts produces a shift of 4 mils. This increasing sensitivity makes drop positioning less accurate when larger deflections are employed, and therefore the above mentioned three position recording system is preferred over five or seven position recording. The shape of curve 75 also indicates that the recording system of this invention is less sensitive to crosstalk positioning errors than prior art systems having a linear voltage response.

As mentioned above it is not necessary that the recording liquid be electrically conductive. This can be understood by referring to the following equation, which sets forth the force $\overline{F}$ acting on a small body located within an electrical field:

$$\overline{F} = q\overline{E} + \overline{p}\cdot\nabla\overline{E}$$

Where $q$ is the electrical charge on the body, $\overline{E}$ is the electrical field vector, and $\overline{p}$ is the polarization vector or moment of the charge polarization. Since both $q$ and $\overline{p}$ are proportional to $\overline{E}$, the force $\overline{F}$ is proportional to the square of the voltage applied to the field generating electrode. In the case of a non-conductive liquid $q$ is zero, so that only the second term of the above equation is applicable. In the case of a uniform electrical field the second term is likewise zero. However, for deflection electrodes of the type and arrangement herein of interest, the electrical field has a considerable gradient. Quite obviously a dielectric liquid stream will have a sizable polarization moment when subjected to a strong electrical field, and in the case of a field having a substantial gradient, the resulting force on the filament can have a not insignificant value. The above expression is, of course, quite complex, because a dyadic field is specified by $\nabla\overline{E}$.

Quite naturally one would expect that a dielectric liquid stream would be deflected less than a corresponding conductive liquid filament for the same applied electrical field. Experimentation has confirmed, however, that a dielectric material such as ethanol can be deflected far enough to obtain 3 mils of lateral drop positioning shift by application of a differential voltage $V_1$ of 175 volts to one of the deflection electrodes. A cooperative dumping potential $V_0$ of like amount has been observed to produce a corresponding dumping shift of 3 mils. This data was taken under conditions similar to those applicable for the data of FIGS. 5 and 6.

An examination of the above set out force equation will reveal that the right hand term is merely the classical expression for the force on an electrical dipole situated within an electrical field. The corresponding expression for a continuously flowing stream of dielectric liquid necessarily is quite complex and has not been derived. However, it will be apparent that the force in any event will be a gradient function and will go to zero in an uniform field. Thus the operation of a dielectric jet recorder in accordance with this invention becomes closely analogous to the operation of a ferrofluid jet recorder as described in Johnson, U.S. Pat. Nos. 3,510,878 and in Fan et al 3,805,272.

In cases where the recording liquid is not perfectly dielectric but has some conductivity, then an electrical charge is available for augmentation of stream deflection. Generally speaking, the deflection due to the presence of an electrical charge is the dominant contributor for a liquid of even moderate conductivity. With this invention, however, it becomes possible to deflect and switch a continuously flowing stream of liquid without restriction to any particular conductivity range and without requiring any special magnetic properties. This enables printing with non-conductive organic liquids such as alcohol base textile dyes. It is even possible to switch a dielectric liquid such as kerosene for fuel injection purposes. Other applications will be readily apparent.

Figure 7:
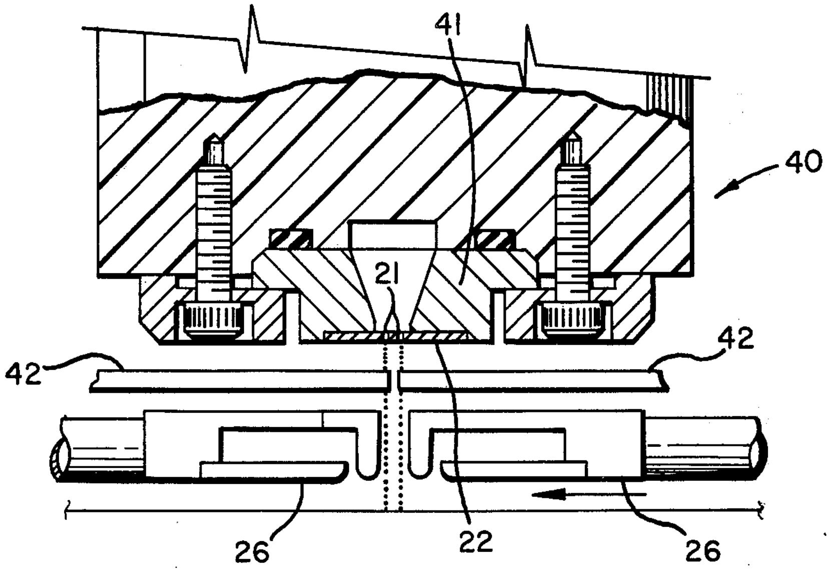
FIG. 7 is a cross-sectional drawing of a recording head constructed in accordance with this invention.

The preceding discussion describes the invention in terms of only a single stream. A recording head 40 in preferred form is illustrated in FIG. 7. In the preferred form there are two rows of orifices 21 regularly spaced along orifice plate 22. A recording liquid supply manifold is defined by orifice plate holder 41, which is sealed against orifice plate 22. A pair of electrode plates 42 are spaced below orifice plate 22 and above a pair of catchers 26.

The general twin row arrangement is similar in some respects to the recording head arrangement disclosed in Brady et al U.S. Pat. No. 3,805,273. In the arrangement of Brady et al, however, it is necessary that the stream forming orifices be sufficiently close together for solid printing coverage without any lateral deflection of the streams. In accordance with this invention, orifices 21 can be reduced in diameter for production of smaller drops; solid printing coverage being achieved by lateral deflection of each of the streams. As taught by the prior art referred to in Brady et al, it is necessary that the control of drops in one row be delayed in time with respect to the drops in other rows of jets. Such a timing delay is necessary to produce registration of the print on the print receiving medium. The discussion which follows will relate to only one row of streams and to deflection of only one stream within such a row.

Figure 8:
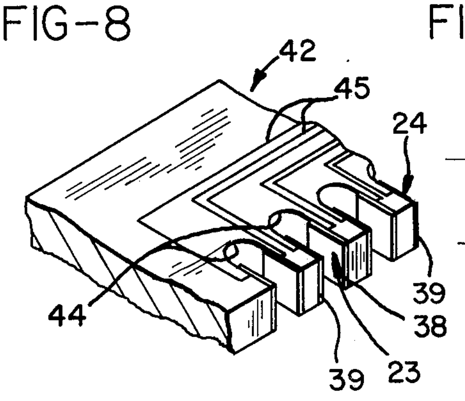
FIG. 8 is a pictorial drawing of a portion of a charge plate.

FIG. 8 illustrates a portion of deflection plate 42, with reference numeral usage corresponding to the usage of FIGS. 1 through 4. It will be understood that the offset and the lateral positioning of liquid streams 20 relative to the deflection electrodes is as previously described with reference to the lateral deflection plane L and the dumping plane D.

As illustrated in FIG. 8, deflection electrodes occur in pairs, with the left member of each pair being denoted by the reference numeral 23 and the right member of each pair being denoted by the reference numeral 24. The leading edges of electrodes are denoted by the reference numerals 38 and 39 respectively. Electrodes 23 and 24 are plated inside a series of notches 44 and are connected to a series of control lines 45. Typically the streams may be spaced at a spacing of about 75 streams per inch, so that the effective spacing of the twin row arrangement is 150 streams per inch. Since each stream directs its drops toward three printing positions, the recording head has 450 printing positions per lateral inch of print receiving medium 27. Orifices 21 may have a diameter of about 1 mil, and deflection plate 42 may be spaced about 10 mils below orifice plate 22. The lateral spacing between the surfaces of the electrode pairs is about 6 mils, all as described above in connection with FIGS. 5 and 6.

A simplified schematic of electrical circuitry for controlling the charging of electrodes 23 and 24 is illustrated in FIG. 9. As illustrated therein a master clock signal is applied to a line 46, which is connected to the input terminal of a counting and decoding unit 47. Unit 47 comprises a two-bit counter for counting clock pulses on input lines 46. Unit 47 further comprises a decoder, which decodes the two-bit count to provide sequential output signals on output lines 48 through 51. Output line 51 resets the counter after every fourth count, and output lines 48 through 50 synchronize the generation of differential deflection control signals for electrodes 23 and 24. Clock signal 46 is also applied to a pair of amplifiers 58 and 59 for control of drive motor 31 and stimulation transducer 30.

The signals or decoded counts on lines 48 through 50 are utilized as inputs to sets of NOR gates such as gates 52 through 54 and 55 through 57 as illustrated. A set of three such NOR gates is provided for each stream, and each such NOR gate has a data input line, such as one of the illustrated lines $\overline{D}_1$ through $\overline{D}_6$. Each data line carries binary printing information for one laterally spaced print position for drops from an associated stream.

As further illustrated in FIG. 9 there are four transistors 60 through 63, which are switched from conducting to non-conducting states, by output signals from NOR gates 52 through 54. A similar switching arrangement is provided for each pair of deflection electrodes 23 and 24. A voltage $V_0$ representing the cooperative deflection voltage for dumping control is applied to a terminal 64, and this potential in turn is applied to both of deflection electrodes 23 and 24 unless one of transistors 60 through 63 has been switched into a conducting state. Whenever any of transistors 60 through 63 is rendered conductive, there is a voltage drop across at least one of four collector resistances 67 through 70.

So long as no signal representing a no-print or dumping command is present on any of the input data lines, then transistors 60 through 63 are cyclically rendered conductive in pairs as follows: first transistors 61 and 62, then transistors 60 and 62 and finally transistors 60 and 63. Thereafter the sequence is repeated. A pair of OR gates 65 and 66 are connected as illustrated to enable the aforementioned switching sequence. Appearance of a dumping signal on a data line during any of the switching steps gates off the two transistors, which otherwise would be conductive during that step. As a result the potential $V_0$ applied to terminal 64 is not dropped across any of the collector resistances 67 through 70, and the stream 20 is deflected in the offset direction toward catcher 26.

As a result of the above described switching sequence a pair of deflection control signals 71 and 72 are generated, as illustrated generally in FIG. 10. The signal 71 is the charging voltage which appears on the left deflection electrode 23, while signal 72 is the charging voltage which appears on the right deflection electrode 24. It will be seen that both of signals 71 and 72 are stepped from a level of 0 to $V_1$ and back to 0 with a relative phase shift such that the two signals are never simultaneously on any non zero voltage. Thus the application of the two signals to the deflection electrodes creates what might be termed a differential charge.

Whenever a dumping signal is applied to one of the data lines, then both of signals 71 and 72 jump simultaneously to a voltage $V_0$ for cooperative application to electrodes 23 and 24. Such a cooperative signal is illustrated in FIG. 10 by the portions of duration d as illustrated for both of signals 71 and 72. The illustrated cooperative charging signal replaces the differential charging signal illustrated by dotted lines and is shown as occurring for three consecutive time periods. This would be produced by sequential application of dumping signals to NOR gates 53, 54 and 52.

As previously discussed in connection with the description of FIGS. 3 and 4, the application of a lateral deflection voltage $V_1$ to only one of the electrodes of a deflection electrode pair causes a slight deflection of the stream in the offset direction. This offset movement, while normally quite small, causes a slight shifting of the left and right printing positions relative to the center printing positions. This can be compensated for by adding a slight voltage correction, $V_2$, to the deflection control signals 71 and 72 as indicated by reference numerals 77 and 78 of FIG. 12.

Figures 11, 12:
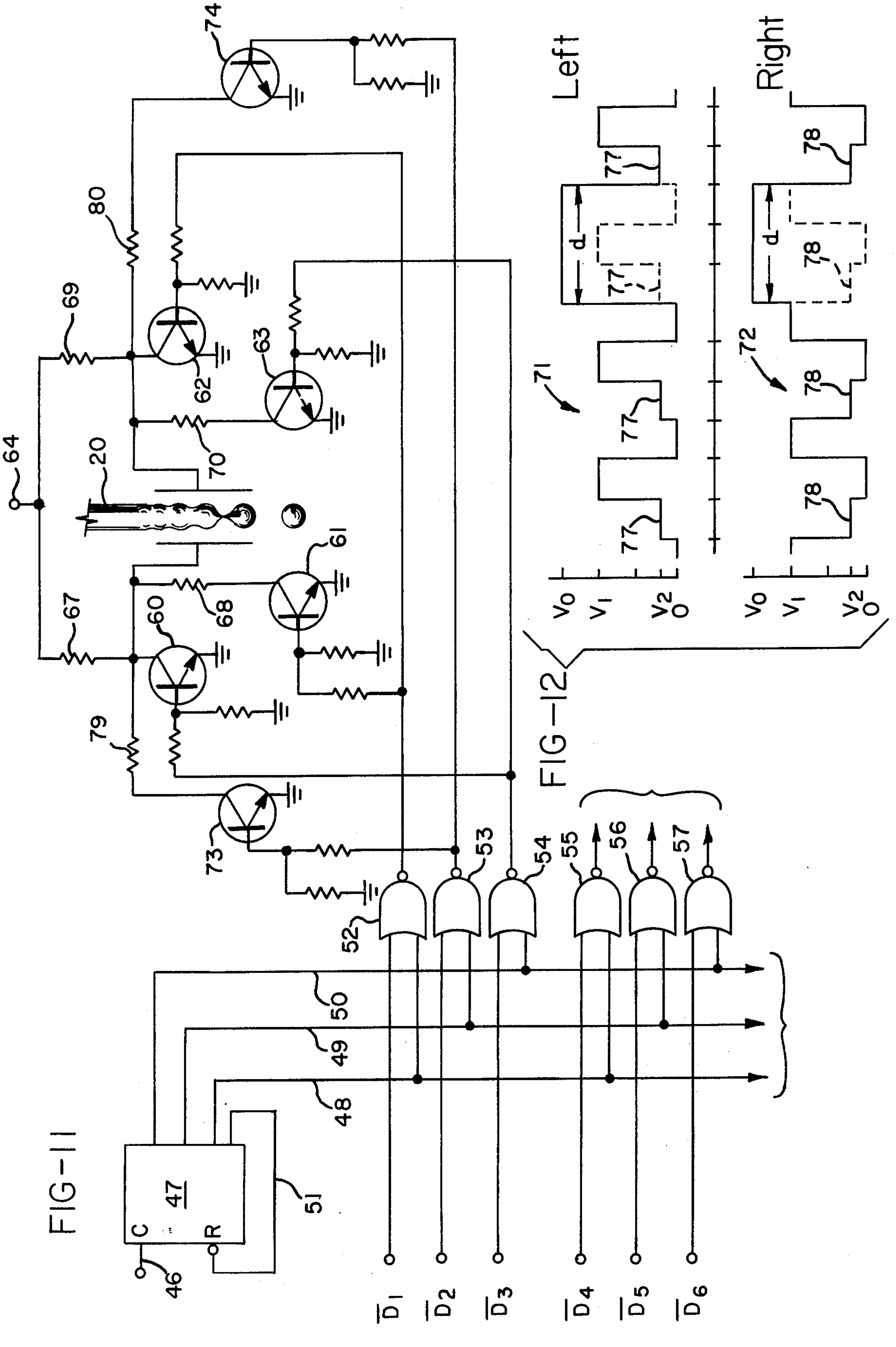
FIG. 11 is a schematic illustration of an alternative embodiment of electrical circuitry for generating charging control signals.
FIG. 12 illustrates charging control signals generated by the circuitry of FIG. 11.

The circuitry for producing the $V_2$ voltage correction is illustrated in FIG. 11 and is seen to be quite similar to the circuitry of FIG. 9. Corresponding reference numerals in FIGS. 11 and 9 represent components having corresponding functions. It will be seen that the main difference between the two circuits is that the circuit of FIG. 11 has eliminated OR gates 65 and 66 and has added transistors 73 and 74, together with associated voltage dropping resistors 79 and 80. FIG. 11 omits stimulation transducer 30 and drive motor 31, but it will be understood that appropriate stream stimulation and web driving apparatus are provided.

Referring now to FIG. 9 it will be seen that an output from NOR gate 53, which corresponds to a center position print command, causes both of transistors 60 and 62 to become conductive, thereby grounding both of electrodes 23 and 24. This produces the zero level during the time period T = 1 through T = 2 on both of signals 71 and 72 as illustrated in FIG. 10.

For the arrangement of FIG. 11 an output from NOR gate 53 causes transistors 73 and 74 to become conductive. This causes a voltage drop across resistor 79 to produce the step 77 of FIG. 12 and a voltage drop across resistor 80 to produce the step 78. The actual magnitude of the steps 77 and 78 depends upon the voltage $V_0$ applied to terminal 64 and the voltage dividing effect produced by the resistance values of resistors 79 and 80 relative to resistors 67 and 69. In general the required drop positioning shift in the dumping direction for compensation of the effect described with reference to FIG. 3 has been found to be less than 1 mil. FIG. 6 indicates that a voltage drop in the order of about 25 volts across resistors 79 and 80 should be sufficient. Assuming that $V_0$ has a value of 100 volts for normal dumping deflection, resistors 79 and 80 should have resistances about 1/3 those of resistors 67 and 69.

Figure 13:
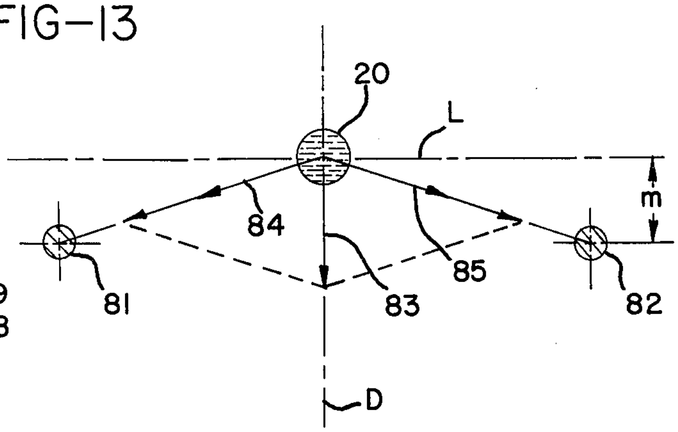
FIG. 13 is a schematic illustration of deflection electrodes in an alternative embodiment of the invention.

FIG. 13 illustrates an electrode arrangement in alternative embodiment. The view of FIG. 13 corresponds generally to the view of FIGS. 3 and 4, there being illustrated the stream 20, the left electrode 81 and a right electrode 82, all in horizontal cross section. The axes of electrodes 81 and 82 are parallel to the axis of stream 20 and are offset from the lateral deflection plane L by a distance M. While equipotential lines have not been constructed for the arrangement of FIG. 13, it should be apparent that the application of a cooperative charging signal to electrodes 81 and 82 will produce a deflection of stream 20 in the dumping plane D as illustrated generally by the arrow 83. The arrow 83 may be viewed as being the vector sum of the illustrated arrows 84 and 85, which represent the differential deflections obtained by application of charging voltages of appropriate magnitude to each of electrodes 81 and 82 separately.

It should be clear that many alternative deflection electrode configurations are possible, but the electrodes should be provided in pairs positioned generally symmetrical with respect to the dumping plane D and offset with respect to the lateral deflection plane L.

While the methods and forms of apparatus herein described constitute preferred embodiments of the invention, it is to be understood that the invention is not limited to these precise methods and forms of apparatus, and that changes may be made therein without departing from the scope of the invention.

What is claimed is:

1. Jet deflection apparatus comprising:
(a) jet forming means for generating a continuous stream of liquid,
(b) a pair of deflection electrodes positioned on opposite sides of said stream and offset from the axis thereof,
(c) catching means spaced apart from said stream forming means, and
(d) signal generating means connected to said deflection electrodes for directing said stream to any of a plurality of operating directions by differential charging of said electrodes and directing said stream toward said catching means by cooperative charging of said electrodes.

2. Apparatus according to claim 1 wherein said stream forming means comprises means to stimulate said jet to break up into uniformly sized and regularly spaced drops and wherein said deflection electrodes are positioned so that at least portions thereof extend upstream above the point of drop formation.

3. Apparatus according to claim 1 wherein said deflection electrodes comprise vertically extending strips having their leading edges offset from the axis of said jet.

4. Apparatus according to claim 1 wherein said catching means are offset from the axis of said jet in the same direction as said electrodes.

5. Jet drop recording apparatus comprising:
(a) means for generating a continuously flowing stream of printing liquid,
(b) means for stimulating said stream to break up into uniformly sized and regularly spaced drops,
(c) a pair of deflection electrodes positioned on opposite sides of said stream and offset from the axis thereof,
(d) signal generating means connected to said deflection electrodes for causing deflection of said stream in the direction of said offset by cooperative charging of said electrodes and causing deflection of said stream laterally toward a plurality of different operating directions by differential charging of said electrodes,
(e) catching means displaced in said offset direction for selective catching of drops directed theretoward by offset deflection of said stream, and,
(f) means for supporting said print receiving medium in a position for receiving drops not caught by said catching means.

6. Apparatus according to claim 5 wherein said electrodes comprise flat parallel strips which extend parallel to the non-deflected axis of said stream.

7. Apparatus according to claim 6 wherein said signal generating means cause said deflection electrodes to deflect said stream toward three different operating directions.

8. Apparatus according to claim 5 wherein said signal generating means comprises means for cyclically generating differential charging control signals and selection means for causing said deflection control electrodes to be charged selectively by said differential charging control signals or by a common charging control voltage in correspondence with information to be printed on said print receiving medium.

9. Apparatus according to claim 8 wherein said support means transports said print receiving medium in synchronism with the cyclical generation of said differential charging control signals.

10. Jet drop control apparatus comprising:
(a) means for generating a continuously flowing stream of liquid,
(b) means for stimulating said stream to break up into uniformly sized and regularly spaced drops,
(c) a pair of vertically extending deflection strips positioned on opposite sides of said stream with the leading edges of the strips offset from the stream axis, and the interior faces thereof extending in the direction of said offset,
(d) drop catching means spaced apart from the axis of said stream in the offset direction for catching said drops when said stream is deflected theretoward, and
(e) signal generating means connected to said deflection strips for deflecting said stream toward said catching means by cooperative charging of said strips and deflecting said stream laterally toward a plurality of different operating directions by differential charging of said strips.

11. Apparatus according to claim 10 and further comprising transport means for transporting a print receiving medium through a printing region reached by said drops when said stream is directed toward any of said operating directions.

12. Apparatus according to claim 11 further comprising means to drive said transport means in synchronism with the operation of said signal generating means.

13. A jet drop recording head comprising:
(a) an orifice plate provided with a row of regularly spaced orifices,
(b) recording liquid supply means for providing a supply of pressurized recording liquid to said orifices and causing production of a row of recording jets therefrom,
(c) a deflection plate spaced apart from said orifice plate and parallel thereto, and
(d) a catcher spaced apart from said deflection plate for catching those of said jets which are directed thereagainst;
said deflection plate being provided with pairs of deflection electrodes which are offset from the axes of said jets for causing deflection of any said jet toward said catcher by cooperative charging of its associated pair of deflection electrodes and causing deflection of the jet to a plurality of laterally spaced recording trajectories by differential charging of said pair of deflection electrodes.

14. Apparatus according to claim 13 wherein said leading edge is notched and said pair of deflection electrodes are plated inside said notches.

15. Apparatus according to claim 14 further comprising stimulation means for causing said jets to define continuous liquid streams which break up into uniformly sized and regularly spaced drops, said deflection plate being positioned such that the upper surface thereof is above the point at which said drops are formed.

16. Apparatus according to claim 15 wherein said electrode pairs are spaced for lateral stream deflection to any of three side-by-side printing directions.

17. Jet drop recording apparatus comprising:
(a) an orifice plate provided with two parallel rows of regularly spaced orifices,
(b) a recording liquid supply manifold sealed against said orifice plate and communicating with said orifices for production of two parallel rows of recording streams,
(c) a pair of deflection plates spaced apart from said orifice plate and having notched leading edges outwardly offset from the axes of said streams,
(d) a series of deflection electrode pairs plated inside said notches so that there is a pair of such electrodes for each stream,
(e) stimulation means for stimulating said streams to break up into drops at a regular frequency with the region of drop formation being below the upper surfaces of said deflection plates,
(f) a pair of catchers supported below said deflection plates and positioned outwardly from said rows of jets for catching of those of said drops which are directed thereagainst,
(g) signal generating means connected to said deflection electrode pairs for causing outward deflection of said streams toward said catchers by cooperative charging of deflection electrode pairs and lateral deflection of said streams toward laterally adjacent operating directions by differential charging of deflection electrode pairs, and
(h) transport means for transporting a web of print receiving material through a printing region reached by said drops when said streams are directed toward any of said operating directions.

18. Apparatus according to claim 17 wherein said signal generating means comprises means for generating differential charging control signals for said electrode pairs in synchronism with the operation of said transport means and means for generating cooperative charging control signals for said electrode pairs in response to recording control signals from an external source.

19. Apparatus according to claim 18 wherein said differential charging control signals are effective for lateral deflection of each stream toward three discrete printing directions and said orifices are spaced for providing solid printing coverage of said print receiving material by cooperating deflection of said two rows of streams.

20. A jet drop recording head comprising:
(a) an orifice plate provided with a row of regularly spaced orifices,
(b) recording liquid supply means for providing a supply of pressurized recording liquid to said orifices,
(c) a deflection plate spaced apart from and parallel to said orifice plate and having a leading edge offset from a lateral deflection plane extending vertically through the centers of said orifices,
(d) a series of deflection electrode pairs plated on said leading edge in registration with said orifices,
(e) signal generating means for supplying cooperative and differential charging signals to said electrode pairs, and
(f) a catcher including a catching surface, said catcher being spaced below said deflection plate such that said catching surface is parallel to said leading edge and is offset from said lateral deflection plane.

21. A method of recording comprising the steps of generating a continuously flowing jet of liquid recording material and directing said jet toward a recording medium, generating a deflection control signal corresponding to a desired deflection sequence, deflecting said jet in accordance with said deflection control signal by establishing a gradient electrical field which extends across the path of said jet and which varies in accordance with variations in said signal, and catching said jet to prevent impact against said recording medium when the jet is directed in one predetermined direction.

22. A method according to claim 21 wherein said gradient electrical field is established by applying said deflection control signal to a pair of deflection electrodes spaced on opposite sides of said jet and offset from the axis thereof.

23. A method according to claim 22 wherein said deflection control signal is applied differentially and cyclically to said electrodes for cyclical laterally spaced print positioning of said jet and is applied cooperatively and intermittently to said electrodes for directing said jet in said predetermined direction and causing recordal of a desired image.

24. A method according to claim 23 wherein said jet is stimulated at a regular frequency to cause recordal of said image by uniformly sized drops.

25. A method of deflecting a jet of uncharged dielectric liquid comprising the steps of generating a deflection control signal corresponding to a desired deflection sequence, deflecting the trajectory of said jet by establishing a gradient electrical field thereacross in accordance with said deflection control signal, and catching said jet in one trajectory position.

26. A method of recording comprising the steps of:

(1) generating a stream of recording liquid and directing said stream through the field of influence of a pair of deflection electrodes, (2) applying cyclical differential charging signals to said electrodes for cyclically deflecting said stream toward laterally different operating directions, (3) in timed correspondence with information to be printed, applying a common charging potential to said electrodes for deflecting said stream in a dumping direction perpendicular to the plane of said operating directions, (4) stimulating said stream to break up into drops which are propelled in said operating directions or said dumping direction in correspondence with the deflection of said stream, (5) catching those of said drops which are propelled in said dumping direction, and (6) transporting a print receiving medium through the region reached by those of said drops which are propelled in said operating directions.

* * * * *